Patented Feb. 13, 1951

2,541,717

UNITED STATES PATENT OFFICE 2,541,717

PTERINE IMINES

Harold G. Petering, Kalamazoo, Mich., assignor to The Upjohn Company, Kalamazoo, Mich., a corporation of Michigan No Drawing. Application October 18, 1948, Serial No. 55,235

9 Claims. (Cl. 260—240)

This invention relates to the condensation of pterine [pyrimido-(4,5b)-pyrazine] aldehydes with primary amines and the 2-amino-4-hydroxy-6-(and 7-)methylenepterine imines resulting therefrom. Among the preferred imines of the present invention are those represented by the formula:

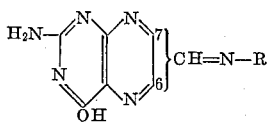

wherein R is an alkyl, aryl, or a para-monosubstituted aryl radical. Among the para-monosubstituted aryl groups contemplated by this invention are those which would result from the removal of one hydrogen atom from the para position in benzoic acid, esters of benzoic acid, benzamide, benzoylglutamic acid and esters and amides of benzoylglutamic acid i. e. radicals from the group consisting of the para-carboxyphenyl and the para-(N-(1,3-dicarboxypropyl)carbamido)-phenyl radicals, their esters and amides.

The compounds of this invention are useful intermediates in the synthesis of other pterine compounds. For example, by reduction, compounds may be obtained represented by the formula:

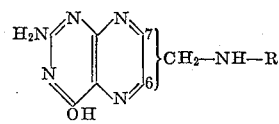

R having the values above-given. Among such compounds are pteroic acid, pteroyl glutamic acid, rhizopterines and related compounds. The products of this invention are yellow to orange crystalline solids, soluble without decomposition in cold aqueous alkalies and acids, sparingly soluble in water and relatively insoluble in most common organic solvents. They char and decompose without definite melting above 300 degrees centigrade. They are characterized by their ultraviolet absorption spectra and in particular by the ratios of their extinction coefficients at the absorption maxima.

The 2-amino-4-hydroxy-6- (and 7-) formylpterines from which the imines of this invention are obtained are described and their preparation by oxidizing 2-amino-4-hydroxy-6- (and 7-) polyhydroxyalkylpterines is described and claimed in copending application Serial No. 55,234, filed October 18, 1948, by Harold G. Petering et al. The 2-amino-4-hydroxy-6- (and 7-) polyhydroxyalkylpterines from which the aldehydes are obtained and their preparation are described and claimed in the copending application Serial 32,983, filed June 14, 1948. According to the methods of the copending applications the 2-amino-4-hydroxy-6- (and 7-) polyhydroxyalkylpterines can be prepared by reacting the osone of a monosaccharide having at least four carbon atoms with a 2,4,5-triamino-6-hydroxypyrimidine or an acid addition salt thereof, hereinafter referred to as a 2,4,5-triamino-6-hydroxypyrimidine compound, in aqueous solution at a pH between about 4.5 and about 9.0. The above reaction is accelerated by moderate heating, as on a steam bath. The desired product can be precipitated from the reaction mixture by acidification to a pH of 4.5 or less. The crude product thus precipitated can be separated, as by filtration, and may then be purified by dissolving in dilute alkali, decolorizing with adsorbent charcoal, and, recovered by acidification and filtration.

The 2-amino-4-hydroxy-6-polyhydroxyalkyl-, and 2-amino-4-hydroxy-7-polyhydroxyalkylpterines thus obtained can be oxidized to 2-amino-4-hydroxy-6-formyl- and 2-amino-4-hydroxy-7-formylpterines respectively as by means of lead tetraacetate. In order to carry out this invention an excess of purified lead tetraacetate, dissolved in warm glacial acetic acid or a mixture of glacial acetic acid and acetic anhydride, is mixed with a solution of the polyhydroxyalkylpterine in water. The reaction is rapid and exothermic. While the starting polyhydroxyalkylpterines may be dissolved in hot water as above, in which they are soluble to the amount of about one-half per cent at 100 degrees centigrade, it is preferred that small amounts of alkali, such as an alkali metal hydroxide, carbonates and bicarbonates and ammonium hydroxide, be used to effect solution. Alternatively the aqueous solution can be acidified to about pH 3 prior to the addition of the lead tetraacetate solution. However, the use of small quantities of alkali is a preferred procedure as the volume of solution required is sufficiently reduced to be of practical importance. An alkaline solution can be used to dissolve the starting polyhydroxyalkylpterine since the large excess of acid added along with the lead tetraacetate assures that the resulting aldehyde will not be destroyed by the added alkali.

The exothermic nature of the reaction causes the temperature to rise to about 80 to 90 degrees centigrade, the final temperature being dependent upon the volume of the solutions. After mixing, the temperature of the reaction mixture is maintained near 90 degrees for an additional length of time to complete the oxidation. The additional time required varies depending on the quantity of reactants with from one-half to several hours being sufficient.

After the oxidation is complete, the $PbO_2$ formed as a by-product of the reaction is removed, preferably by filtration with the addition of a diatomaceous earth filter aid. Upon cooling, the filtrate deposits crystals of the desired aldehyde which are collected for further purification as desired.

The imines of the present invention are formed by the condensation of the above 2-amino-4-hydroxy-6-formyl- or 2-amino-4-hydroxy-7-formylpterines with a primary amine. The condensation may be accomplished in the absence of solvent other than the reacting amine or added inert solvents may be used. This condensation may be carried out under room conditions but a preferred embodiment of the method of this invention contemplates the use of temperatures up to about 100 degrees centigrade and the use of a condensation catalyst, such as zinc chloride, to accelerate the reaction. When the condensation is conducted under room conditions the imine may separate as it is formed, but when higher reaction temperatures are used the product does not separate until the reaction mixture is cooled. The product is then isolated by filtration, centrifugation or other procedures and, after washing with water, alcohol or other solvents, is suitable for use.

The following examples are illustrative of the invention but are not to be considered as limiting.

EXAMPLE 1

Two and twenty-three hundredths grams of 2,4,5-triamino-6-hydroxy-pyrimidine bisulfite and 1.72 grams of barium hydroxide were dissolved in 75 milliliters of water. The pH of the resulting solution was 8.9. To this solution was added 1.8 grams of a glucosone in 50 milliliters of aqueous acetic acid having a pH of 4. The pH of the resulting mixture was adjusted to pH 7.0 during the reaction by addition of ammonium hydroxide or acetic acid, as required. The reaction mixture was heated to 90–100 degrees centigrade for one hour and then acidified with glacial acetic acid to pH 4.5. After cooling, the suspension was centrifuged, the precipitate of barium sulfite and a mixture of crude 2-amino-4-hydroxy-6-(arabo)-tetrahydroxybutylpterine and 2-amino-4-hydroxy-7-(arabo) tetrahydroxybutylpterine was collected and dissolved in 100 milliliters of 1.0 percent sodium hydroxide solution. One milliliter of 30 percent hydrogen peroxide was added, the solution heated to 90–100 degrees centigrade and filtered to remove barium sulfate. The resulting filtrate was treated with 200 milligrams of decolorising charcoal (Norite A) and filtered. The filtrate was acidified to pH 4.5 with glacial acetic acid, the precipitate resulting was removed by centrifugation, washed with hot alcohol and then extracted with warm aqueous ammonium hydroxide at pH 8–8.5. The ammonium hydroxide extract was acidified and a light-yellow to cream colored precipitate produced, which was separated by centrifugation, washed with hot alcohol, then with an acetone-ether mixture, and dried in vacuo. Yield of the desired peterines, 1.35 grams.

The product decomposed without melting above 300 degrees centigrade. The ultraviolet absorption spectra in N/10 sodium hydroxide gave maxima at 252.5 mu and 362 mu and a minimum at 300 mu. The isomeric mixture is characterized by an $$\frac{E_{252}}{E_{362}}$$

absorption spectra ratio of about 2.53. When purified, the 6-isomer has an $$\frac{E_{252}}{E_{362}}$$

ratio of about 3.14.

*Analysis*

|  | C. | H. | N |  |
|---|---|---|---|---|
| Calc | 42.39 | 6.62 | 24.71 | $[\alpha]_d^{25}$ 0.1 N NaOH= −97.3 |
| Found | 41.17 | 4.86 | 24.39 | |

The 7-isomer has an $$\frac{E_{252}}{E_{362}}$$

spectra ratio of about 2.38.

EXAMPLE 2

In the same manner as in Example 1, 2,4,5-triamino-6-hydroxy-pyrimidine was condensed with xylosone and 2-amino-4-hydroxy-6-(D-threo)-trihydroxypropylpterine and 2-amino-4-hydroxy-7-(D-threo)-trihydroxypropylpterine were separated from the reaction product. The 6-trihydroxypropylpterine is characterized by an $$\frac{E_{252}}{E_{362}}$$

ultraviolet absorption spectra ratio of about 2.9.

*Analysis*

|  | C | H | N |
|---|---|---|---|
| Calc | 42.80 | 4.35 | 27.7 |
| Found | 42.87 | 4.22 | 28.0 |

The 7-trihydroxypropylpterine is characterized by a lower $$\frac{E_{252}}{E_{362}}$$

ratio of about 2.25.

In a like manner, an osone of a tetrose, such as threose; a pentose such as arabinose, ribose, lyxose; a hexose such as galactose, sorbose, fructose or mannose; or, a heptose such as glucoheptose, may be condensed with 2,4,5-triamino-6-hydroxy-pyrimidine to give a corresponding pterine having a substituent radical conforming to the structure of the starting sugar. Thus, there may be produced 2-amino-4-hydroxy-6-(D-erythro)-trihydroxypropylpterine, 2-amino-4-hydroxy-6-(L-erythro)-trihydroxypropylpterine, 2-amino-4-hydroxy-6-(D-lyxo)-tetrahydroxypterine, and the like.

The preparation of pterine aldehydes will now be illustrated with specific reference to a tetrahydroxybutylpterine as the starting compound. However, any of the foregoing pterines can be employed in the practice of my invention to yield the starting aldehydes.

EXAMPLE 3.—MIXED FORMYLPTERINES

One hundred thirty-two milligrams of mixed 2-amino-4-hydroxy-(6- and 7-)tetrahydroxybutyl-(D-arabo)pterine was dissolved in 75 milliliters of boiling water and filtered. To the hot filtrate was added 5.32 grams of purified lead tetraacetate dissolved in 100 milliliters of warm acetic acid. After the initial rapid exothermic reaction, the solution was decanted from a small amount of a dark residue and then heated to 80-90 degrees centigrade for an additional 5 minutes, whereupon a flocculent canary yellow precipitate appeared. The reaction mixture was cooled and the precipitate separated. The yellow crystals were washed with 35 milliliters of an ethanol-methanol mixture, 5 milliliters of acetic acid, acetone containing 3 percent acetic acid, hot alcohol and finally with ether. On drying in vacuo, 650 milligrams of a mixture of 2-amino-4-hydroxy-6-formylpterine and 2-amino-4-hydroxy-7-formylpterine was obtained.

The mother liquors from above were treated with phenylhydrazine and 100 milligrams of the phenylhydrazone of the aldehydes obtained.

EXAMPLE 4.—2-AMINO-4-HYDROXY-7-FORMYLPTERINE (a) Ammonium hydroxide was added dropwise to a suspension of 950 milligrams of 2 - amino - 4 - hydroxy - 7 - tetrahydroxybutyl-(D-arabo) pterine in 200 milliliters of boiling water until a clear solution was obtained, about 2.0 milliliters being required. To the hot solution there was added a warm solution of 4.75 grams of lead tetraacetate dissolved in a mixture of 40 milliliters of acetic acid and 10 milliliters of acetic anhydride. The temperature rose upon mixing and was maintained at 90 degrees centigrade for an additional 30 minutes. The excess $PbO_2$ was removed and the filtrate heated to boiling and partially decolorized with a mixture of 100 milligrams of adsorbent charcoal (Darco 60) and 150 milligrams of a diatomaceous earth filter aid (Super Filtrol). Upon cooling, 470 milligrams of crystalline 2-amino-4-hydroxy-7-formylpterine was obtained.

(b) To a suspension of 850 milligrams of 2 - amino - 4 - hydroxy - 7 - tetrahydroxybutylpterine in 60 milliliters of boiling water sufficient sodium bicarbonate was added to give a clear solution. A warm solution of 6.0 grams of lead tetraacetate dissolved in 40 milliliters of acetic acid was mixed with the pterine solution, the solution maintained at a temperature of 80-90 degrees centigrade for an additional twenty minutes, the excess $PbO_2$ removed, and, the resulting clear solution cooled. There was obtained 400 milligrams of 2-amino-4-hydroxy-7-formylpterine.

(c) In a similar manner, 700 milligrams of 2 - amino - 4 - hydroxy - 7 - tetrahydroxybutylpterine dissolved in dilute sodium hydroxide was oxidized with 7.0 grams of lead tetraacetate dissolved in warm acetic acid. On removal of the lead salts and cooling there was obtained 350 milligrams of 2-amino-4-hydroxy-7-formylpterine.

(d) A total of 950 milligrams of the combined reaction products above, each of which had been shown by ultra-violet absorption spectra and reaction with hydroxyl amine to be 7-formylpterines, was heated with denatured ethyl alcohol and filtered. The residue was extracted with four 80 milliliter portions of boiling water buffered to pH 7.0. The combined hot aqueous extracts were cooled, the resulting precipitate collected, extracted with hot alcohol and the residue dried. There was thus obtained 300 milligrams of 2-amino-4-hydroxy-7-formylpterine.

The ultraviolet absorption spectra determined in 0.1 normal sodium hydroxide showed maxima at 252.5 and 360 mu and a minimum at 302 mu.

$$E^{1\%}_{1cm}.—252.5_{mu}=92.2(E_{mol}=19300)$$

$$E^{1\%}_{1cm}.—360_{mu}=38.9(E_{mol}=8100)$$

$$\frac{E—252.5 \text{ mu}}{E—360 \text{ mu}}=2.37$$

EXAMPLE 5.—2-AMINO-4-HYDROXY-6-FORMYLPTERINE (a) A solution of 550 milligrams of 2-amino-4 - hydroxy - 6 - tetrahydroxybutyl - (D - arabo) - pterine in 50 milliliters of boiling water containing sufficient sodium bicarbonate to effect solution was filtered. To the hot filtrate having a pH of 8.5 was added 2.6 grams of lead tetraacetate dissolved in 25 milliliters of hot acetic acid. The mixture was heated for an additional 15 minutes at 90-100 degrees centigrade and then filtered while hot to remove excess lead dioxide. The solution was cooled, the resulting precipitate collected, washed with alcohol and ether and dried under reduced pressure. There was obtained 170 milligrams of crude 2-amino-4-hydroxy-6-formylpterine showing the characteristic ultraviolet absorption spectra.

(b) Likewise from 850 milligrams of 6-tetrahydroxybutyl-(D-arabo) pterine and 7.5 grams of lead tetraacetate there was obtained 330 milligrams of product showing characteristic ultraviolet absorption spectra of 2-amino-4-hydroxy-6-formylpterine.

(c) A solution of 670 milligrams of 6-tetrahydroxybutyl-(D-xylo) pterine was dissolved in 50 milliliters of water containing sufficient sodium bicarbonate to effect solution and filtered. To the hot filtrate having a pH of about 8.5 was added 7.5 grams of lead tetraacetate dissolved in warm glacial acetic acid. The reaction mixture was heated for an additional one-half hour at 90-100 degrees centigrade, filtered while hot to remove the excess lead dioxide, cooled and the resulting precipitate collected. There was thus obtained a solid product which after washing with alcohol and ether and drying under reduced pressure weighed 240 milligrams and showed characteristic ultraviolet absorption spectra of 2-amino-4-hydroxy-6-formylpterine.

(d) The above three preparations were combined into a single sample and 680 milligrams of the combined sample was extracted with 80 milliliters of boiling water buffered to pH 5.5. The residue was extracted an additional two times with 100 milliliter portions of boiling water buffered to pH 7.0. The aqueous extracts were combined, heated to boiling and filtered. On cooling the crystalline 2-amino-4-hydroxy-6-formylpterine which separated was collected, washed with 3A alcohol and ether and dried under reduced pressure. There was thus obtained 200 milligrams of 2-amino-4-hydroxy-6-formylpterine.

The ultraviolet absorption spectra determined in 0.1 normal sodium hydroxide gave maxima at 255 mu, 365 mu and a minimum at 310 mu.

$$E^{1\%}_{1cm}. \; 255 \text{ mu}=89.9(E_{mol}=18800)$$

$$E^{1\%}_{1cm}. \; 365 \text{ mu}=47.8(E_{mol}=10000)$$

$$\frac{E \; 255 \text{ mu}}{E \; 365 \text{ mu}}=1.88$$

The following examples illustrate the preparation, from starting compounds of the type above-described, of the compounds forming part of the subject matter of the present invention. The use of n-butylamine illustrates my procedure for making the 2-amino-4-hydroxy-6- (and 7-)-methylenepterine-N-alkyl imines, such as isopropyl, tertiary butyl, octyl, cetyl, et cetera.

EXAMPLE 6

Two hundred milligrams of a mixture of 2-amino-4-hydroxy-6- (and 7-) formylpterines was dissolved in 25 milliliters of anhydrous n-butylamine under room conditions and allowed to stand an additional three hours. One hundred milliliters of ether was added, the resulting precipitate collected and washed with alcohol and ether. There was thus obtained 190 milligrams of mixed 2-amino-4-hydroxy-6-methylenepterine-N-butyl imine and 2-amino-4-hydroxy-7-methylenepterine-N-butyl imine.

The ultraviolet absorption spectra determined in 0.1 normal sodium hydroxide showed maxima at 252–253 mu and 360 mu with a minimum at 300 mu.

The use of octylamine rather than n-butylamine, according to the procedure of the above example, produces the corresponding —N-octyl imine.

EXAMPLE 7

To a solution of 250 milligrams of 2-amino-4-hydroxy-6-formylpterine in water adjusted to a pH of 5.5 there was added 1.5 grams of p-aminobenzoic acid. The solution was heated for one hour at 70–90 degrees centigrade, decolorized with 200 milligrams of adsorbent charcoal, filtered and cooled. On cooling, the resulting Schiff's base, 2-amino-4-hydroxy-6-methylenepterine-N-p-carboxyphenyl imine, separated. The product was collected, washed with methyl alcohol and dried. The ultraviolet absorption spectra as determined in 0.1 normal sodium hydroxide solution showed maxima at 258–260 mu and 368 mu with a plateau at 270–280 mu and a minimum at 325 mu and a ratio:

$$\frac{E\ 258\ mu}{E\ 368\ mu}=2.55$$

When ethyl-p-aminobenzoate is condensed in a similar manner with 2-amino-4-hydroxy-6-formylpterine the Schiff's base, 2-amino-4-hydroxy-6-methylenepterine-N-p-carbethoxyphenyl imine, is obtained.

When N'-p-amino-benzoylglutamic acid is condensed with 2-amino-4-hydroxy-6-formylpterine under similar conditions, the corresponding Schiff's base, 2-amino-4-hydroxy-6-methylene-N-p-N'-glutamylcarbamidophenyl imine, is obtained.

EXAMPLE 8

To a solution of the 2-amino-4-hydroxy-7-formylpterine obtained by the oxidation of 2.83 grams of 2-amino-4-hydroxy-7-tetrahydroxybutyl-(D-arabo)pterine adjusted to a pH of 5.0 there was added 4.0 grams of p-aminobenzoic acid. The reaction mixture was heated at 80–90 degrees centigrade for about one hour, decolorized with 500 milligrams of decolorizing charcoal and filtered. Upon cooling the Schiff's base, 2-amino-4-hydroxy-7-methylene-N-p-carboxyphenyl imine, separated and was collected, washed with alcohol and dried, a total of 1.18 grams being obtained. The ultraviolet absorption spectra, determined in 0.1 normal sodium hydroxide solution showed absorption maxima at 255 mu and 360 mu, and a ratio:

$$\frac{E\ 255\ mu}{E\ 360\ mu}=3.32$$

In a like manner, when aniline is condensed with 2-amino-4-hydroxy-7-formylterine, the Schiff's base, 2-amino-4-hydroxy-7-methylenepterine-N-phenyl imine, is obtained.

When 2-amino-4-hydroxy-7-formylpterine is condensed with p-amino-benzamide under conditions as above, the Schiff's base, 2-amino-4-hydroxy-7-methylenepterine-N-p-carbamidophenyl imine, is obtained.

Various modifications may be made in the present invention in the light of the above disclosure, without departing from the spirit or scope thereof, and it is to be understood that I limit myself only as defined in the appended claims.

I claim:

1. A 2-amino-4-hydroxy-methylenepterine imine.

2. A 2-amino-4-hydroxy-6-methylenepterine imine.

3. A 2-amino-4-hydroxy-7-methylenepterine imine.

4. A 2-amino-4-hydroxy-methylenepterine-N-alkyl imine.

5. A compound having the formula

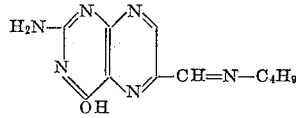

6. A 2-amino-4-hydroxy-methylenepterine-N-para-mono-substituted aryl imine, wherein the N-para-mono-substituted aryl radical is selected from the group consisting of the para-carboxyphenyl and the para-(N-(1,3-dicarboxypropyl)-carbamido)-phenyl radicals, their esters and amides.

7. A compound having the formula:

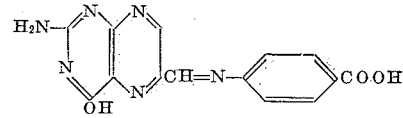

8. A compound having the formula

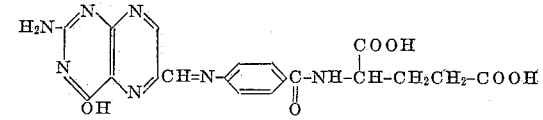

9. A method for the preparation of pterine imines comprising: mixing a member of the group consisting of 2-amino-4-hydroxy-6-formylpterine and 2-amino-4-hydroxy-7-formylpterine with a primary amine; heating the mixture to between about 25 and about 100 degrees centigrade; and, isolating the reaction product.

HAROLD G. PETERING.

REFERENCES CITED

The following references are of record in the file of this patent:

UNITED STATES PATENTS

| Number | Name | Date |
| --- | --- | --- |
| 2,442,836 | Angier | June 8, 1948 |

OTHER REFERENCES

Richter: Textbook of Organic Chemistry, John Wiley and Sons, N. Y., page 502 (1938 edition).

Angier et al.: Science, 103, 667–669 (1946).

Gates: Chemical Reviews, 41, 66 and 69 (1947).